(12) United States Patent
Eom et al.

(10) Patent No.: US 11,409,182 B2
(45) Date of Patent: Aug. 9, 2022

(54) LIQUID LENS AND CAMERA MODULE AND OPTICAL APPARATUS COMPRISING SAME

(71) Applicant: LG INNOTEK CO., LTD., Seoul (KR)

(72) Inventors: Seong Su Eom, Seoul (KR); Jun Phill Eom, Seoul (KR); Kyu Tae Lee, Seoul (KR); Seung Han Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 222 days.

(21) Appl. No.: 16/480,193

(22) PCT Filed: Jan. 24, 2018

(86) PCT No.: PCT/KR2018/001063
§ 371 (c)(1),
(2) Date: Jul. 23, 2019

(87) PCT Pub. No.: WO2018/139850
PCT Pub. Date: Aug. 2, 2018

(65) Prior Publication Data
US 2020/0089077 A1 Mar. 19, 2020

(30) Foreign Application Priority Data
Jan. 24, 2017 (KR) .................. 10-2017-0011339

(51) Int. Cl.
*G02B 3/14* (2006.01)
*G02F 1/29* (2006.01)

(52) U.S. Cl.
CPC ............ *G02F 1/29* (2013.01); *G02F 1/294* (2021.01)

(58) Field of Classification Search
None
See application file for complete search history.

(56) References Cited

U.S. PATENT DOCUMENTS

| 5,436,766 A | 7/1995 | Leary |
| 6,188,526 B1 | 2/2001 | Sasaya et al. |
| 10,466,468 B2 | 11/2019 | Karam et al. |

(Continued)

FOREIGN PATENT DOCUMENTS

| CN | 1776459 A | 5/2006 |
| CN | 1991415 A | 7/2007 |

(Continued)

OTHER PUBLICATIONS

International Search Report (PCT/ISA/210) issued in PCT/KR2018/001063, dated May 4, 2018.

*Primary Examiner* — Thanh Nhan P Nguyen
(74) *Attorney, Agent, or Firm* — Birch, Stewart, Kolasch & Birch, LLP

(57) ABSTRACT

The present invention provides a liquid lens comprising a first plate having a cavity for receiving conductive liquid and nonconductive liquid formed thereon, a first electrode disposed on an upper portion of the first plate, a second electrode disposed on a lower portion of the first plate, a second plate disposed on an upper portion of the first electrode, and a third plate disposed on a lower portion of the second electrode, wherein at least one of the first plate and the second plate comprises a structure through which at least one of the conductive liquid and the nonconductive liquid can flow.

21 Claims, 8 Drawing Sheets

(56) References Cited

U.S. PATENT DOCUMENTS

2007/0002455 A1    1/2007  Berge et al.
2007/0153400 A1 *  7/2007  Oh ........................ G02B 26/005
                                                        359/666

FOREIGN PATENT DOCUMENTS

| CN | 101346656 A | 1/2009 |
| CN | 101999087 A | 3/2011 |
| CN | 202033490 U | 11/2011 |
| CN | 105011902 A | 11/2015 |
| JP | 4078575 B2 | 4/2008 |
| JP | 2014-213425 A | 11/2014 |
| KR | 10-2007-0013591 A | 1/2007 |
| KR | 10-0723241 B1 | 5/2007 |
| WO | WO-2008082025 A1 * | 7/2008 ............... G02B 3/14 |

* cited by examiner

[FIG. 1]
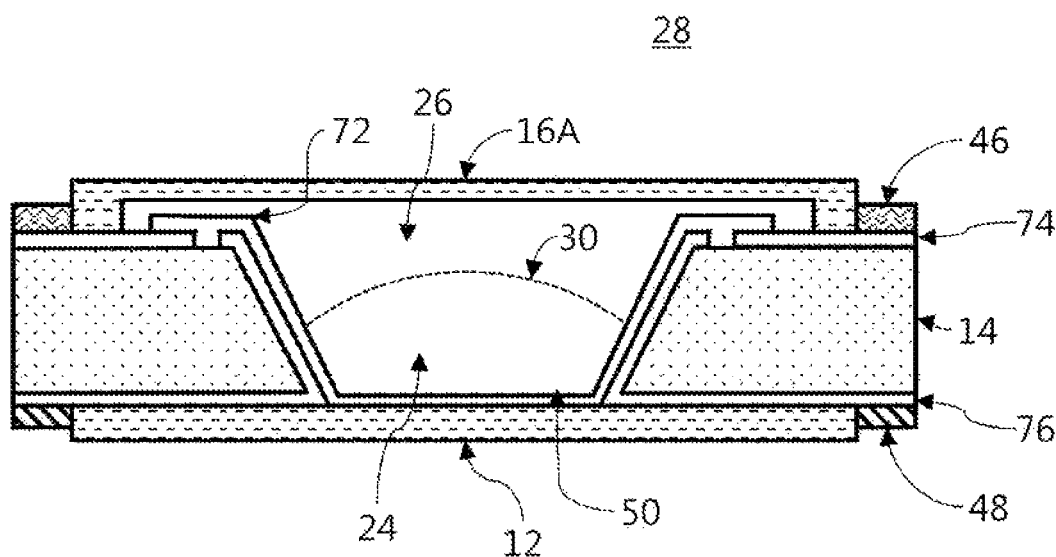
[FIG. 2]
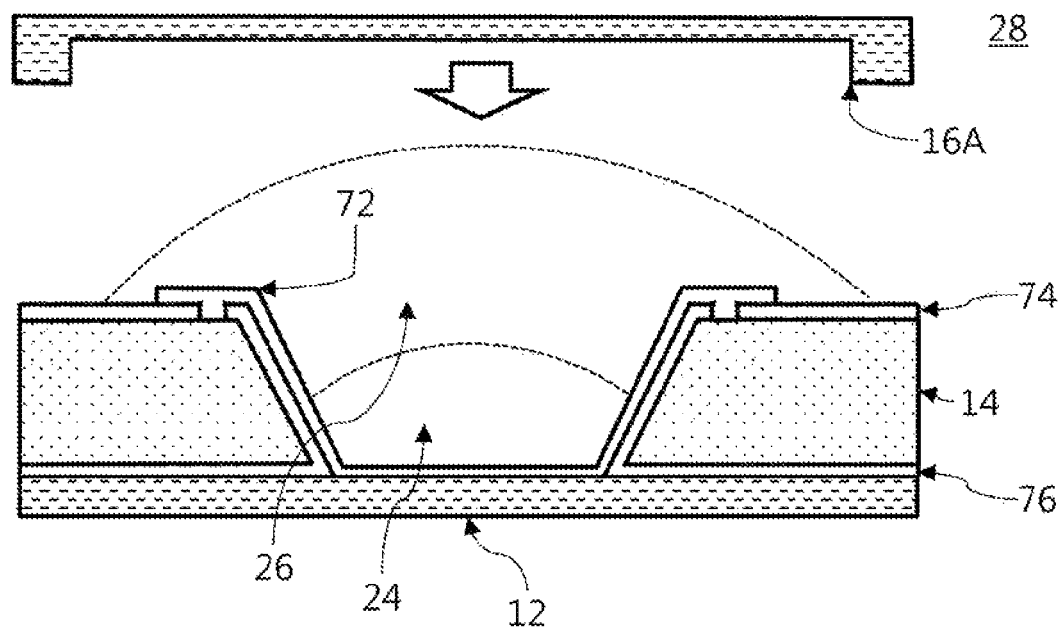

[FIG. 3]
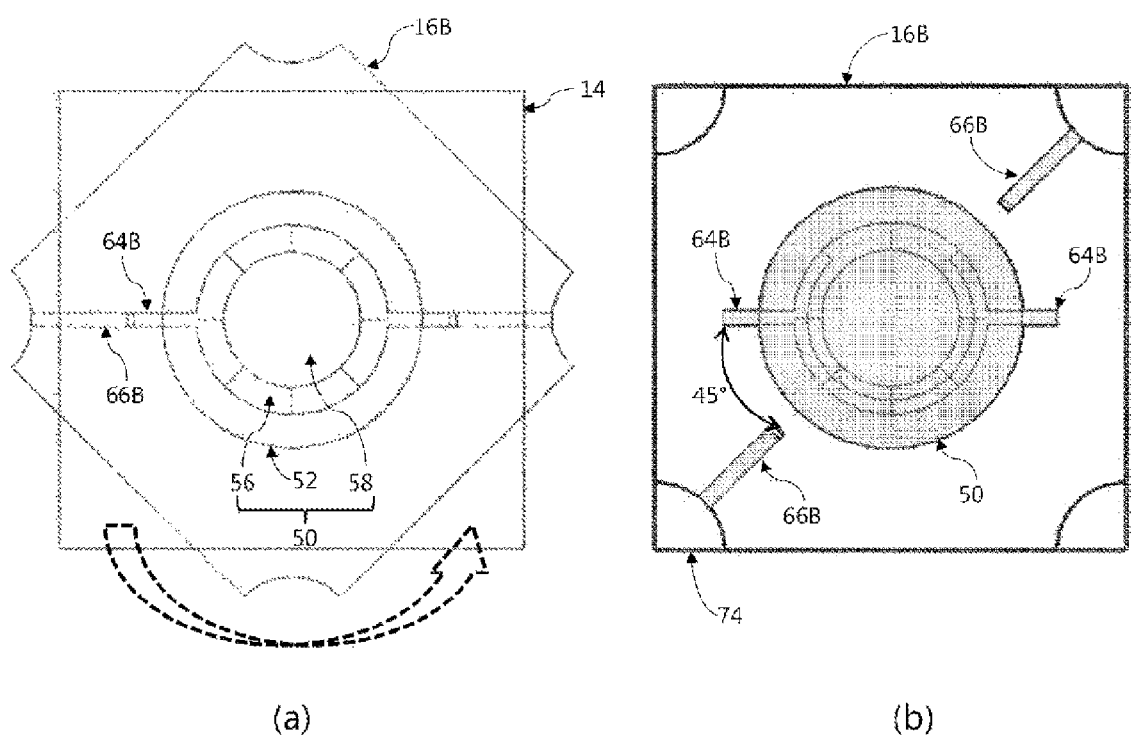
(a)　　　　　　　　　　　　　　(b)

[FIG. 4]
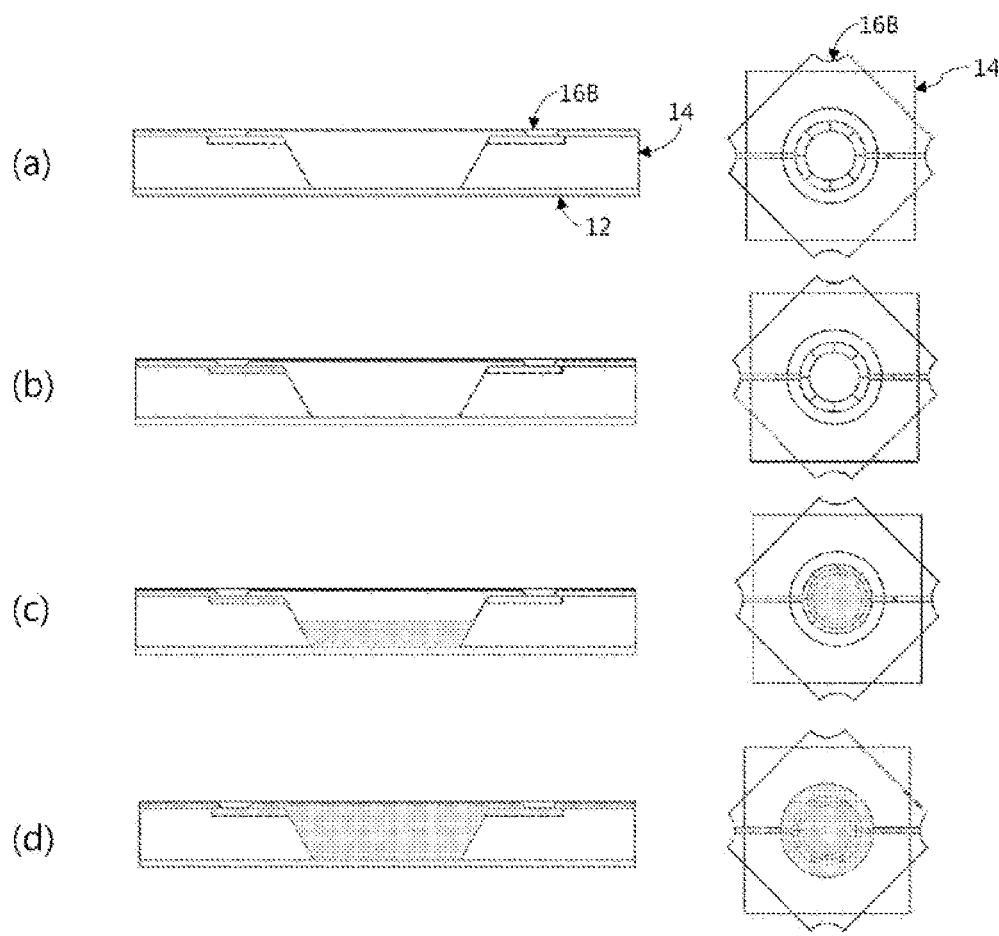

[FIG. 5]
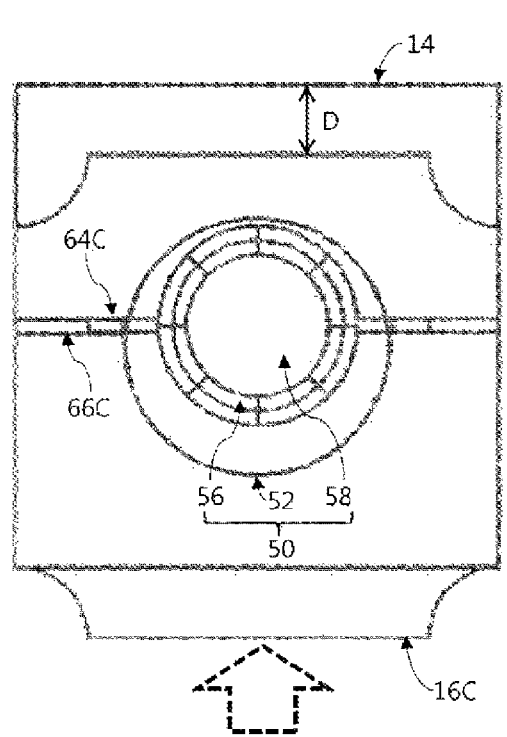
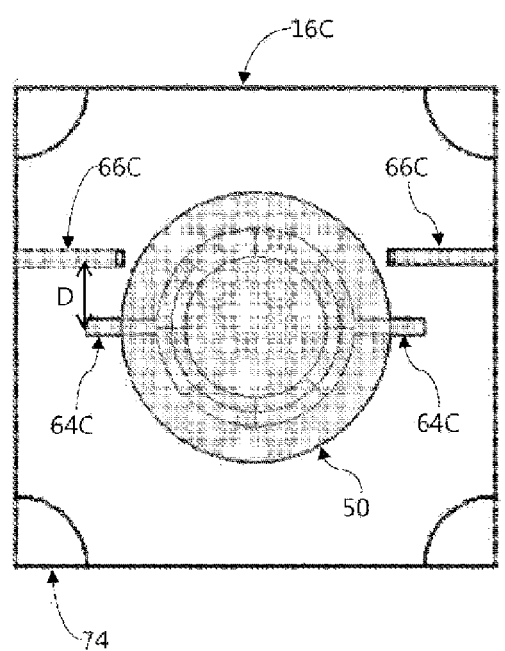
(a)　　　　　　　　　　　　　　　(b)

[FIG. 6]
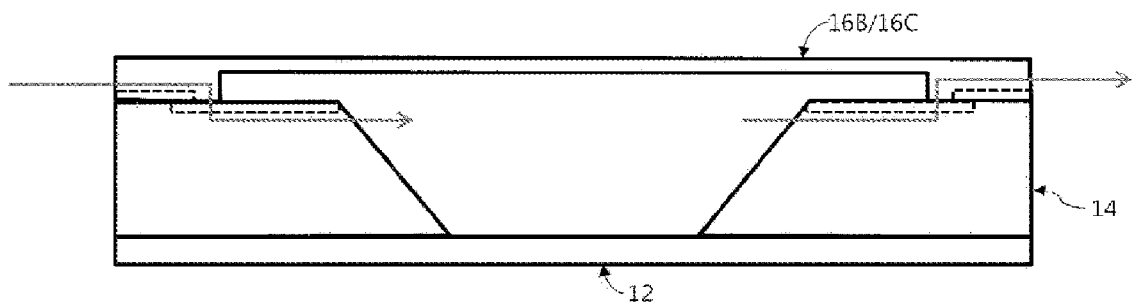
[FIG. 7]
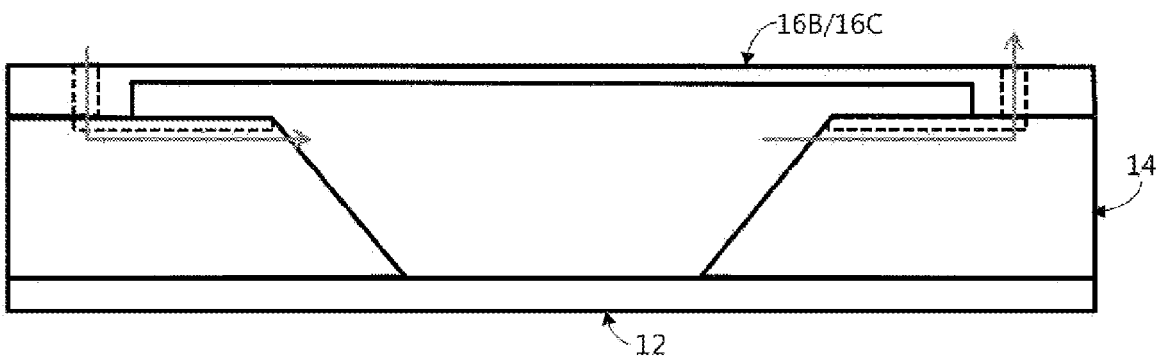

[FIG. 8]
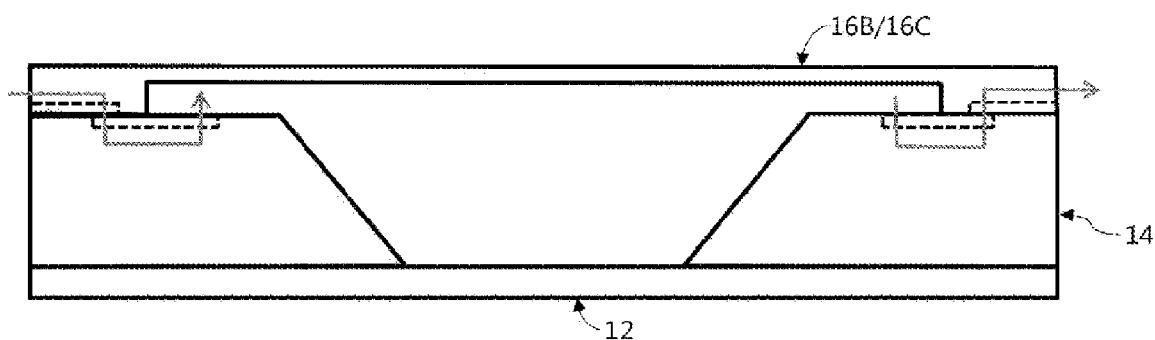
[FIG. 9]
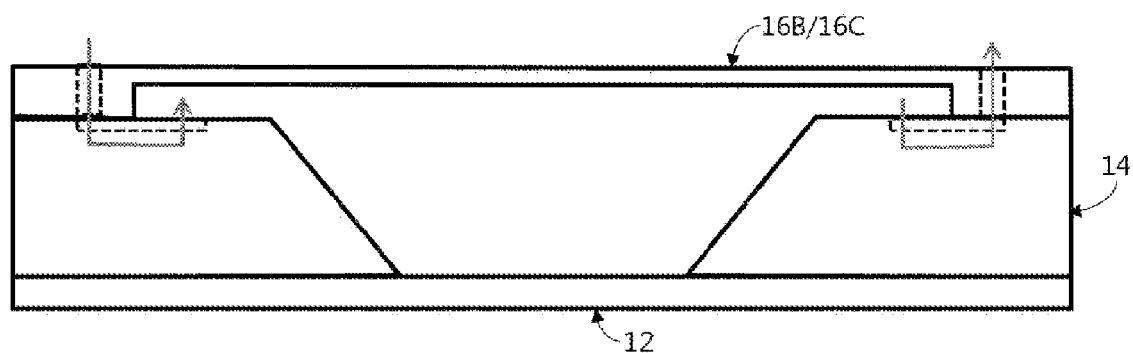

【FIG. 10】
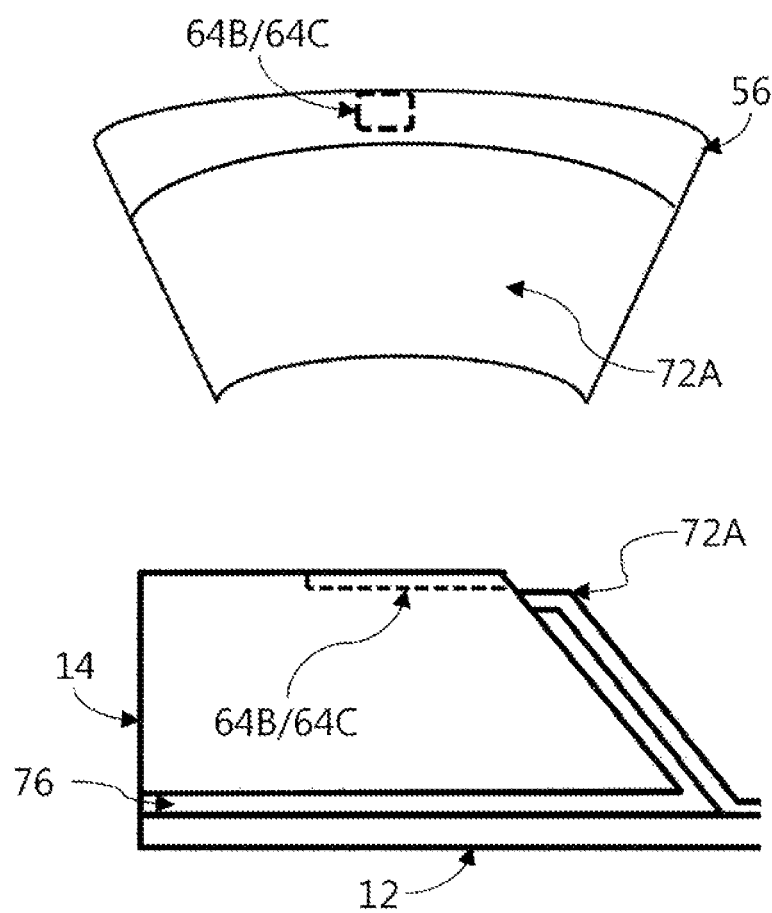

[FIG. 11]
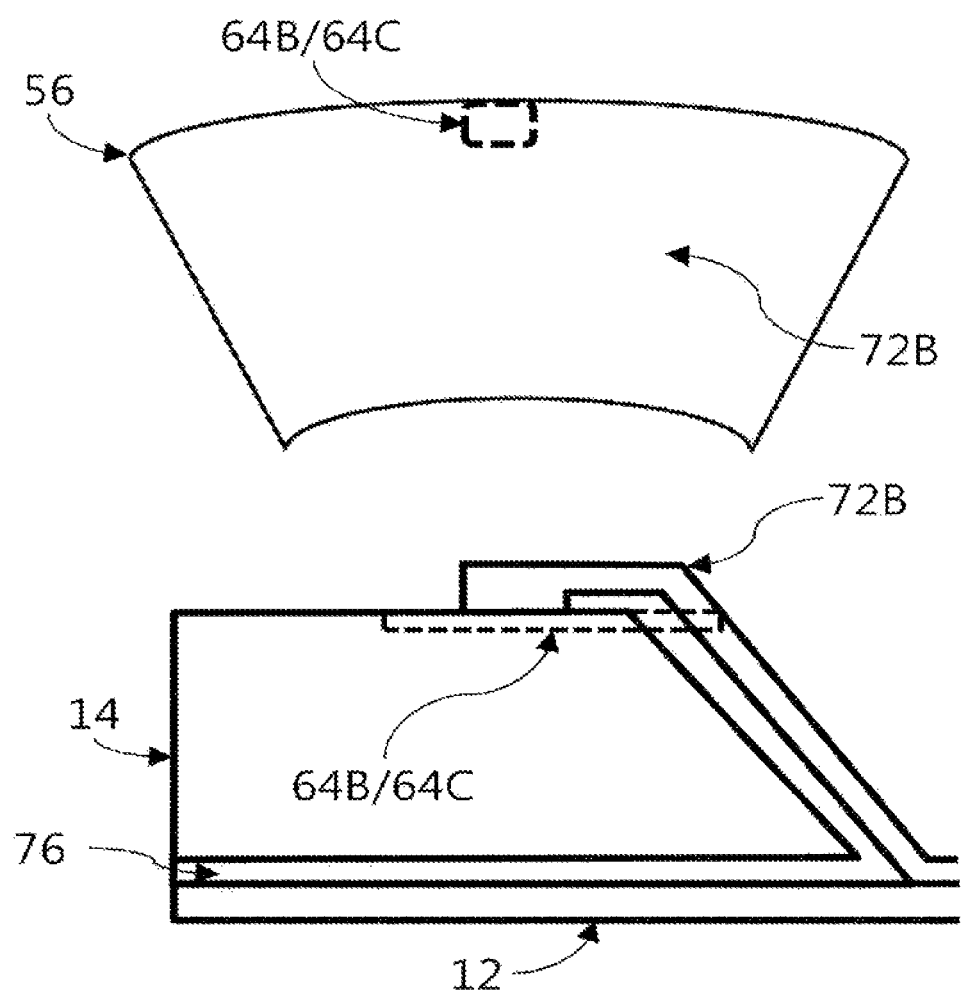

LIQUID LENS AND CAMERA MODULE AND OPTICAL APPARATUS COMPRISING SAME

CROSS REFERENCE TO RELATED APPLICATIONS

This application is the National Phase of PCT International Application No. PCT/KR2018/001063, filed on Jan. 24, 2018, which claims priority under 35 U.S.C. 119(a) to Patent Application No. 10-2017-0011339, filed in the Republic of Korea on Jan. 24, 2017, all of which are hereby expressly incorporated by reference into the present application.

TECHNICAL FIELD

The present disclosure relates to a liquid lens, a camera module including the same, and an optical device. More particularly, the present disclosure relates to a structure of a liquid lens enabling adjustment of a focal length using electrical energy and a method of manufacturing the liquid lens.

BACKGROUND ART

People who use portable devices demand optical devices that have high resolution, are small, and have various photographing functions (an optical zoom-in/zoom-out function, an autofocus (AF) function, a hand tremor compensation or optical image stabilization (OIS) function, etc.). Such photographing functions may be realized by directly moving a plurality of lenses that are combined. In the case in which the number of lenses is increased, however, the size of an optical device may be increased. The autofocus and hand tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens moving apparatus is used to move the lens module. However, the lens moving apparatus has high power consumption, and an additional cover glass needs to be provided separately from the camera module in order to protect the lens moving apparatus, thus leading to an increase in the overall thickness of an optical device. Therefore, research has been conducted on a liquid lens configured to electrically adjust the curvature of an interface between two kinds of liquid in order to perform autofocus and hand tremor compensation functions.

DISCLOSURE

Technical Problem

The present disclosure may provide a structure of a liquid lens capable of adjusting the position of an interface formed between two kinds of liquid using electrical energy and completely charging the two kinds of liquid in a cavity without creating air, bubbles or empty spaces.

In addition, the present disclosure may provide a structure of a liquid lens in which two kinds of liquid are completely charged in a cavity without creating air, bubbles, or empty spaces through a mechanical process, thereby reducing a production time compared to a process of manually injecting liquids into a cavity so as to remove air, bubbles, or empty spaces therefrom.

However, the objects to be accomplished by the disclosure are not limited to the above-mentioned objects, and other objects not mentioned herein will be clearly understood by those skilled in the art from the following description.

Technical Solution

In one embodiment, a liquid lens may include a first plate including a cavity formed therein to accommodate a conductive liquid and a non-conductive liquid therein, a first electrode disposed on the first plate, a second electrode disposed under the first plate, a second plate disposed on the first electrode, and a third plate disposed under the second electrode, wherein at least one of the first plate or the second plate may include a structure formed therein to allow at least one of the conductive liquid or the non-conductive liquid to flow therethrough.

In addition, the first electrode may include at least one electrode sector, and the second electrode may include two or more electrode sectors.

In addition, the liquid lens may further include an insulation layer disposed on the second electrode.

In addition, the structure may be formed in a shape of a pipe or a hole having a circular or polygonal planar structure.

In addition, the structure may include a first structure included in the first plate, and a second structure included in the second plate. The first structure and the second structure may be connected to each other under predetermined conditions.

In addition, the first structure and the second structure may be connected to or separated from each other through rotation of the second plate to a predetermined angle on the first plate.

In addition, the predetermined angle may be at least one of 45 degrees or 90 degrees.

In addition, the first structure and the second structure may be connected to or separated from each other through movement of the second plate in a predetermined direction on the first plate.

In addition, the predetermined direction may be one of an up-down direction or a left-right direction, and a moving distance may be greater than the cross-sectional length of the first structure and less than half a value obtained by subtracting the diameter of a larger open region of the first plate from the size of the liquid lens, or less than a value obtained by subtracting the diameter of the larger open region from the diameter of an inner region of the second plate.

In addition, the second electrode may extend from a region below the first plate to a height below the first structure, and an insulation layer disposed on the second electrode may extend to a height below the first structure.

In addition, the first structure may penetrate the second electrode and the insulation layer disposed on the second electrode.

In addition, the first structure may be disposed in a space formed in a predetermined pattern of the second electrode, and may penetrate the insulation layer disposed on the second electrode.

In addition, the first structure may have at least one structure of a path formed to be straight so as to allow at least one of the conductive liquid or the non-conductive liquid to pass therethrough in a direction from above to below or in a direction reverse thereto or a path including at least one bent portion so as to allow at least one of the conductive liquid or the non-conductive liquid to pass therethrough in a direction from the side to below or in a direction reverse thereto.

In addition, the second structure may have at least one structure of a path including at least one bent portion so as to allow at least one of the conductive liquid or the non-conductive liquid to pass therethrough in a direction from above to the side or in a direction reverse thereto or a path including at least two bent portions so as to allow at least one of the conductive liquid or the non-conductive liquid to pass therethrough in a direction from above to the side and thereafter from the side to above or in a direction reverse thereto.

In addition, the second structure included in the second plate may be spaced apart from the central region, through which an optical signal may pass, by a predetermined distance.

In another embodiment, a liquid lens may include a first plate including a cavity formed therein to accommodate a conductive liquid and a non-conductive liquid therein, a first electrode disposed on the first plate, a second electrode disposed under the first plate, a second plate disposed on the first electrode, and a third plate disposed under the first electrode. The first plate may include a first groove and a second groove formed in any one of the upper surface or the lower surface thereof so as to be connected to the cavity. The first plate or the third plate, which faces the first groove and the second groove, may include a first hole and a second hole formed therein so as to penetrate the upper surface and the lower surface thereof. As the location of the plate facing the first groove and the second groove is adjusted (parallel movement or axial movement), a portion of the first groove may be disposed so as to overlap a portion of the first hole in an optical-axis direction, and a portion of the second groove may be disposed so as to overlap a portion of the second hole in the optical-axis direction.

In addition, the second electrode may include a plurality of electrode sectors, which are sequentially disposed in the clockwise direction about the optical axis.

In still another embodiment, a liquid lens may include a first plate including a cavity formed therein to accommodate a conductive liquid and a non-conductive liquid therein, a first electrode disposed on the first plate, a second electrode disposed under the first plate, a second plate disposed on the second electrode, and a third plate disposed under the first electrode. The cavity formed in the first plate may include a first cavity formed in a circular shape and a second cavity extending from the first cavity and including a first groove and a second groove formed in the first plate. One of the upper plate and the lower plate, which faces the second cavity, may include a first hole (or a slit) and a second hole formed therein. As the location of the plate facing the second cavity with respect to the first plate is adjusted (parallel movement or axial movement), a portion of the first groove may be disposed so as to overlap a portion of the first hole in an optical-axis direction, and a portion of the second groove may be disposed so as to overlap a portion of the second hole in the optical-axis direction.

In addition, the first hole (or the slit) and the second hole may be spaced apart from the first cavity by a predetermined distance.

In still another embodiment, a liquid lens may include a first plate including a cavity formed therein to accommodate a conductive liquid and a non-conductive liquid therein, a first electrode disposed on the first plate, a second electrode disposed under the first plate, a second plate disposed on the second electrode, and a third plate disposed under the first electrode. The cavity formed in the first plate may include a first cavity formed in a circular shape and a second cavity extending from the first cavity and including a first groove and a second groove formed in the first plate. One of the second plate and the third plate, which faces the second cavity, may include a first hole (or a slit) and a second hole formed therein. An imaginary straight line interconnecting the first groove and the second groove may be parallel to or may form a constant angle with an imaginary straight line interconnecting the first hole and the second hole.

In still another embodiment, a liquid lens may include a first plate including a cavity formed therein to accommodate a conductive liquid and a non-conductive liquid therein, a first electrode disposed on the first plate, a second electrode disposed under the first plate, a second plate disposed on the second electrode, and a third plate disposed under the first electrode. The cavity formed in the first plate may include a first cavity formed in a circular shape and a second cavity extending from the first cavity and including a first groove and a second groove formed in the first plate. One of the second plate and the third plate, which faces the second cavity, may include a first hole (or a slit) and a second hole formed therein. The first hole and the second hole may be disposed so as not to overlap the cavity in an optical-axis direction and may be coupled to the first plate.

However, the above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of a device according to the disclosure will be described below.

The present disclosure may provide a structure of a liquid lens enabling a process of mechanically removing bubbles or air layers therefrom.

In addition, according to the disclosure, it is possible to improve the productivity of a liquid lens by effectively removing bubbles or air layers from the liquid lens.

However, the effects achievable through the disclosure are not limited to the above-mentioned effects, and other effects not mentioned herein will be clearly understood by those skilled in the art from the following description.

DESCRIPTION OF DRAWINGS

FIG. 1 illustrates the structure of a liquid lens.
FIG. 2 illustrates a first example of a method of manufacturing the liquid lens.
FIG. 3 illustrates a first example of the liquid lens.
FIG. 4 illustrates a process of injecting liquids into the liquid lens shown in FIG. 3.
FIG. 5 illustrates a second example of the liquid lens.
FIG. 6 illustrates a third example of the liquid lens.
FIG. 7 illustrates a fourth example of the liquid lens.
FIG. 8 illustrates a fifth example of the liquid lens.
FIG. 9 illustrates a sixth example of the liquid lens.
FIG. 10 illustrates a seventh example of the liquid lens.
FIG. 11 illustrates an eighth example of the liquid lens.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

FIG. 1 illustrates the structure of one embodiment of a liquid lens 28.

The liquid lens may include liquids, a first plate, and an electrode. The liquids 26 and 24 included in the liquid lens may include a conductive liquid and a non-conductive liquid. The first plate may include a cavity 50 in which the conductive liquid and the non-conductive liquid are disposed. The cavity 50 may include an inclined surface. The electrode may be disposed on the first plate 14, or may be disposed under the first plate 14. The liquid lens may further include a second plate 16, which may be disposed on (or under) the electrode. In addition, the liquid lens may further include a third plate 12, which may be disposed under (or on) the electrode. As illustrated, one embodiment of the liquid lens 28 may include an interface 30 formed by two different liquids 26 and 24. In addition, the liquid lens 28 may include at least one substrate 46 and 48, which supplies a voltage to the liquid lens 28. The corners of the liquid lens 28 may be thinner than the center portion of the liquid lens 28.

The liquid lens 28 may include two different liquids, namely the conductive liquid 26 and the non-conductive liquid 24, and the curvature and the shape of the interface 30 formed by the two liquids may be adjusted by a driving voltage supplied to the liquid lens 28. The driving voltage supplied to the liquid lens 28 may be transmitted through the first substrate 48 and the second substrate 46. The first substrate 48 may serve to transmit four distinct individual driving voltages, and the second substrate 46 may serve to transmit a common voltage. The voltages supplied through the second substrate 46 and the first substrate 48 may be applied to a plurality of electrodes 74 and 76 exposed from the corners of the liquid lens 28.

In addition, the liquid lens 28 may include a third plate 12 and a second plate 16A, which include a transparent material, and may further include a first plate 14, which is disposed between the third plate 12 and the second plate 16A and includes an open region having a predetermined inclined surface. Depending on the embodiment, light incident from the outside may pass through the liquid lens 28 in a direction from the third plate 12 to the second plate 16A.

In addition, the liquid lens 28 may include a cavity 50, which is defined by the third plate 12, the second plate 16A, and the open region of the first plate 14. Here, the cavity 50 may be filled with two liquids 26 and 24 having different properties (e.g. a conductive liquid and a non-conductive liquid), and an interface 30 may be formed between the two liquids 26 and 24 having different properties.

Further, at least one of the two liquids 26 and 24 included in the liquid lens 28 may be conductive, and the liquid lens 28 may further include an insulation layer (or, insulation film) 72, which is disposed on the two electrodes 74 and 76, which are disposed on and under the first plate 14, and on the inclined surface, which may come into contact with the conductive liquid. Here, the insulation layer 72 may cover one (e.g. the second electrode 76) of the two electrodes 74 and 76, and may expose a portion of the other one (e.g. the first electrode 74) of the two electrodes 74 and 76 so that electrical energy is applied to the conductive liquid (e.g. 26). Here, the first electrode 74 may include at least one electrode sector, and the second electrode 76 may include two or more electrode sectors. For example, the second electrode 76 may include a plurality of electrode sectors, which are sequentially disposed in the clockwise direction about the optical axis.

One or two or more substrates 46 and 48 may be connected to the two electrodes 74 and 76 included in the liquid lens 28 in order to transmit a driving voltage thereto. The curvature and the inclination of the interface 30 formed in the liquid lens 28 may be changed in response to the driving voltage, whereby the focal length of the liquid lens 28 may be adjusted.

FIG. 2 illustrates a first example of a method of manufacturing the liquid lens 28.

As shown in the drawing, according to the method of manufacturing the liquid lens 28, the first plate 14, on which the first electrode 74 and the second electrode 76 are disposed, is bonded to the third plate 12, and thereafter the insulation layer 72 is formed on the second electrode 76.

Thereafter, the non-conductive liquid 24 is charged into the liquid lens, and the conductive liquid 26 is charged so as to be located on the non-conductive liquid 24. Water (H2O) may be used as the conductive liquid 26. Depending on the embodiment, an ingredient for enhancing conductivity may be added to water (H2O).

After the conductive liquid 26 is sufficiently charged, the second plate 16A is moved downwards in a direction of an arrow, and is coupled to the first plate 14. Here, the first electrode 74 may include metal such as chrome (Cr), and may serve as an adhesive between the second plate 16A and the first plate 14.

Before the second plate 16A is connected to the first plate 14, as shown in the drawing, the conductive liquid 26 needs to be charged to the extent that the conductive liquid 26 overflows. The reason for this is that bubbles are likely to be created in the conductive liquid 26 in the process of connecting the second plate 16A to the first plate 14.

In the case in which bubbles (or air layers) other than the conductive liquid 26 and the non-conductive liquid 24 are contained in the cavity 50 in the liquid lens 28 (refer to FIG. 1), the liquid lens 28 may not normally function as a lens, i.e. a function of controlling the refractive index of an optical signal passing through the liquid lens using the curvature and the inclination of the interface 30 (refer to FIG. 1), due to the bubbles (or the air layers). This is because an optical signal may be refracted or reflected by bubbles (or air layers) other than the interface 30.

As described above with reference to FIG. 2, bubbles (or air layers) may be contained in the liquid lens 28 in the process of connecting the second plate 16A to the first plate 14, thus leading to deterioration in production yield of the liquid lens 28. In order to obviate this problem, the process of connecting the second plate 16A to the first plate 14 may be performed in a water tub, a water tank, or the like, which is filled with the conductive liquid 26, so as to prevent bubbles (or air layers) from being contained in the liquid lens 28. This method, however, may deteriorate the productivity of the liquid lens 28.

FIG. 3 illustrates a first example of the liquid lens. Specifically, (a) illustrates a state in which at least one of the two different liquids is injected into the cavity 50 before the second plate 16B is rotated, and (b) illustrates a state in which the second plate 16B is rotated to a predetermined angle and is bonded to the first plate 14 after at least one of the two different liquids is injected into the cavity 50.

Referring to FIG. 3(a), the first plate 14 includes a first path 64B formed therein, and the second plate 16B includes a second path 66B formed therein. The first plate 14 includes a small open region 58 and an inclined surface 56 formed in a lower side thereof. The inclined surface 56 is formed such that the size of the open region 58 gradually increases in a direction from the lower side of the first plate to the upper side thereof. For example, the angle of the inclined surface 56 may be about 60 degrees, but may vary depending on the embodiment. The second plate 16B may include a central region 52 formed therein, which is wider than the open region 58 formed in the first plate 14. The central region 52 of the second plate 16B needs to be larger than a large open region 58, which is formed at the upper side of the inclined surface 56 of the first plate 14, so as not to disturb an optical signal passing through the liquid lens 28. The peripheral region of the second plate 16B, rather than the central region 52 thereof, may be bonded to the first plate 14. Further, the central region 52 of the second plate 16B and the second path 66B disposed in the second plate 16B are physically spaced apart from each other. For example, the central region 52 of the second plate 16B and the second path 66B disposed in the second plate 16B may be spaced apart from each other by a distance corresponding to the length of the first path 64B in the first plate that may protrude from the central region 52 of the second plate 16B.

Referring to FIG. 3(b), when the two different liquids are completely charged in the cavity 50 defined by the first plate 14 and the second plate 16B, the second plate 16B may be rotated to 45 degrees with respect to the first plate 14, and thereafter may be bonded to the first plate 14. When the second plate 16B is rotated to 45 degrees with respect to the first plate 14, the first path 64B disposed in the first plate 14 and the second path 66B disposed in the second plate 16B may be separated from each other. After the two liquids are completely charged through the first path 64B disposed in the first plate 14 and the second path 66B disposed in the second plate 16B so as to remove empty spaces (bubbles or air layers), the first path 64B disposed in the first plate 14 and the second path 66B disposed in the second plate 16B may be offset from each other, thereby preventing the two liquids completely charged in the cavity 50 from flowing out of the cavity or preventing a new air layer from being introduced into the cavity 50.

Although it is illustrated by way of example in FIG. 3 that the second plate 16B is rotated to 45 degrees with respect to the first plate 14, a configuration in which the second plate is rotated to 90 degrees may also be made depending on the embodiment. Further, depending on the embodiment, the rotation angle may be determined within a range from a minimum angle (e.g. 10 degrees), by which the first path 64B disposed in the first plate 14 and the second path 66B disposed in the second plate 16B are separated from each other, to 170 degrees (a value obtained by subtracting 10 degrees from 180 degrees), so long as an alignment error is stably eliminated.

Further, referring to FIGS. 3(a) and 3(b), the corner portions of the second plate 16B may be patterned so as to expose electrodes 74 disposed on the first plate 14. Thus, when the second plate 16B is rotated and then bonded to the first plate 14, the electrodes 74 may be exposed to the above.

FIG. 4 illustrates a process of injecting liquids into the liquid lens shown in FIG. 3. Specifically, (a) to (d) illustrate a method of completely charging liquids into the internal space defined by the first plate 14, the second plate 16B, and the third plate 12, i.e. the cavity 50 (refer to FIG. 1), using the first path and the second path, which are structures disposed in the first plate 14 and the second plate 16B of the liquid lens.

First, referring to (a), the first path and the second path, which are structures disposed in the first plate 14 and the second plate 16B, are connected to each other. At this time, the first path and the second path, which are structures disposed in the first plate 14 and the second plate 16B, may be connected at two or more regions to each other.

Subsequently, referring to (b), a liquid is injected through one connection portion between the first path and the second path, which are structures disposed in the first plate 14 and the second plate 16B. Although not illustrated, the liquid is not injected through the opposite connection portion between the first path and the second path, which are structures disposed in the first plate 14 and the second plate 16B, but air may flow out of the cavity 50 through the opposite connection portion.

Subsequently, referring to (c), one of two different liquids is charged to a predetermined amount into the cavity 50.

Thereafter, referring to (d), the other one of the two different liquids is completely charged into the cavity 50. At this time, it is important to completely remove empty spaces (bubbles or air layers), which may be created in the cavity 50, by allowing the liquid to be injected through the one connection portion between the first path and the second path, which are structures disposed in the first plate 14 and the second plate 16B, and allowing the liquid to overflow through the opposite connection portion between the first path and the second path.

When the two different liquids are completely charged in the cavity 50, the second plate 16B may be rotated with respect to the first plate 14, and may be bonded to the first plate 14, as described above with reference to FIG. 3(b).

FIG. 5 illustrates a second example of the liquid lens. Specifically, (a) illustrates a state in which at least one of the two different liquids is injected into the cavity 50 before the second plate 16C is moved in a direction of an arrow, and (b) illustrates a state in which the second plate 16C is moved a predetermined distance D and is bonded to the first plate 14 after at least one of the two different liquids is injected into the cavity 50.

Referring to FIG. 5(a), the first plate 14 includes a first path 64C formed therein, and the second plate 16C includes a second path 66C formed therein. The first plate 14 includes a small open region 58 and an inclined surface 56 formed in a lower side thereof. The inclined surface 56 is formed such that the size of the open region 58 gradually increases in a direction from the lower side of the first plate to the upper side thereof. For example, the angle of the inclined surface 56 may be about 60 degrees, but may vary depending on the embodiment. The second plate 16C may include a central region 52 formed therein, which is wider than the open region 58 formed in the first plate 14. The central region 52 of the second plate 16C needs to be larger than a large open region 58, which is formed at the upper side of the inclined surface 56 of the first plate 14, so as not to disturb an optical signal passing through the liquid lens 28. The peripheral region of the second plate 16C, rather than the central region 52 thereof, may be bonded to the first plate 14. Further, the central region 52 of the second plate 16C and the second path 66C disposed in the second plate 16B are physically spaced apart from each other. For example, the central region 52 of the second plate 16B and the second path 66C disposed in the second plate 16B may be spaced apart from each other by a distance corresponding to the length of the first path 64C in the first plate that may protrude from the central region 52 of the second plate 16B.

Referring to FIG. 3(b), when the two different liquids are completely charged in the cavity 50 defined by the first plate 14 and the second plate 16C, the second plate 16C may be moved a predetermined distance D with respect to the first plate 14, and thereafter may be bonded to the first plate 14. When the second plate 16C is moved a predetermined distance D with respect to the first plate 14, the first path 64C disposed in the first plate 14 and the second path 66C disposed in the second plate 16C may be separated from each other. After the two liquids are completely charged through the first path 64C disposed in the first plate 14 and the second path 66C disposed in the second plate 16C so as to remove empty spaces (bubbles or air layers), the first path 64C disposed in the first plate 14 and the second path 66C disposed in the second plate 16C may be offset from each other, thereby preventing the two liquids completely charged in the cavity 50 from flowing out of the cavity or preventing a new air layer from being introduced into the cavity 50.

The predetermined distance D by which the second plate 16C is moved is substantially the same as an interval D between the first path 64C disposed in the first plate 14 and the second path 66C disposed in the second plate 16C after the movement. Since the central region 52 and the second path 66C need to be spaced apart from each other after the movement of the second plate 16C, the moving distance D needs to be greater than the cross-sectional length of the first path 64C. Further, in order to inject a sufficient amount of liquid into the cavity 50 and to efficiently remove empty spaces, bubbles, or air layers, the moving distance D may be less than half a value obtained by subtracting the diameter of the large open region of the first plate 14 (i.e. the upper diameter of the inclined surface 56) from the overall length (size) of the liquid lens 28, or may be less than a value obtained by subtracting the diameter of the large open region of the first plate 14 (i.e. the upper diameter of the inclined surface 56) from the diameter of the inner central region 52 of the second plate 16C.

Further, referring to FIGS. 3(a) and 3(b), the corner portions of the second plate 16C may be patterned so as to expose electrodes 74 disposed on the first plate 14. Thus, when the second plate 16C is rotated and then bonded to the first plate 14, the electrodes 74 may be exposed to the above.

Referring to FIGS. 3 and 5, after the first plate 14 and the second plate 16B or 16C are coupled to each other, the first path included in the first plate 14 and the second path included in the second plate 16B or 16C may be parallel to each other or may have a predetermined angular interval therebetween.

Hereinafter, various embodiments of the first path 64B or 64C disposed in the first plate 14 and the second path 66B or 66C disposed in the second plate 16B or 16C, which have been described above with reference to FIGS. 3 and 5, will be described. Here, the first path 64B or 64C or the second path 66B or 66C may be formed in the shape of a pipe (a tube), a hole, a furrow (a groove), or a slit that has a circular or polygonal planar structure. Depending on the embodiment, the first path 64B or 64C and the second path 66B or 66C, through which at least one of the two liquids is transmitted and charged into the cavity 50, may be formed so as to have the same shape as each other and may be connected to each other, which may enable more efficient transmission of the liquid. However, even when the first path 64B or 64C and the second path 66B or 66C are formed in different shapes, it is possible to transmit at least one of the two liquids and to charge the same into the cavity 50, so long as the connection or separation thereof is not disturbed by the different shapes thereof.

FIG. 6 illustrates a third example of the liquid lens.

As shown in the drawing, the second path disposed in the second plate 16B or 16C may include at least one bent portion so as to allow at least one of the conductive liquid or the non-conductive liquid to pass therethrough in a direction from the side to below or in a direction reverse thereto. Further, the first path disposed in the first plate 14, which is selectively connected to the second path, may include at least one bent portion so as to allow at least one of the conductive liquid or the non-conductive liquid to pass therethrough in a direction from above to the side or in a direction reverse thereto. When the first path disposed in the first plate 14 and the second path disposed in the second plate 16B or 16C are connected to each other, a liquid may be injected in a direction of an arrow through one connection portion therebetween, and air may be discharged in a direction of an arrow through the opposite connection portion therebetween.

FIG. 7 illustrates a fourth example of the liquid lens.

As shown in the drawing, the second path disposed in the second plate 16B or 16C may be formed to be straight so as to allow at least one of the conductive liquid or the non-conductive liquid to pass therethrough in a direction from above to below or in a direction reverse thereto. Further, the first path disposed in the first plate 14, which is selectively connected to the second path, may include at least one bent portion so as to allow at least one of the conductive liquid or the non-conductive liquid to pass therethrough in a direction from above to the side or in a direction reverse thereto. When the first path disposed in the first plate 14 and the second path disposed in the second plate 16B or 16C are connected to each other, a liquid may be injected in a direction of an arrow through one connection portion therebetween, and air may be discharged in a direction of an arrow through the opposite connection portion therebetween.

FIG. 8 illustrates a fifth example of the liquid lens.

As shown in the drawing, the second path disposed in the second plate 16B or 16C may include at least one bent portion so as to allow at least one of the conductive liquid or the non-conductive liquid to pass therethrough in a direction from the side to below or in a direction reverse thereto. Further, the first path disposed in the first plate 14, which is selectively connected to the second path, may include at least two bent portions so as to allow at least one of the conductive liquid or the non-conductive liquid to pass therethrough in a direction from above to the side and thereafter from the side to above or in a direction reverse thereto. When the first path disposed in the first plate 14 and the second path disposed in the second plate 16B or 16C are connected to each other, a liquid may be injected in a direction of an arrow through one connection portion therebetween, and air may be discharged in a direction of an arrow through the opposite connection portion therebetween.

FIG. 9 illustrates a sixth example of the liquid lens.

As shown in the drawing, the second path disposed in the second plate 16B or 16C may be formed to be straight so as to allow at least one of the conductive liquid or the non-conductive liquid to pass therethrough in a direction from above to below or in a direction reverse thereto.

Further, the first path disposed in the first plate 14, which is selectively connected to the second path, may include at least two bent portions so as to allow at least one of the conductive liquid or the non-conductive liquid to pass therethrough in a direction from above to the side and thereafter from the side to above or in a direction reverse thereto. When the first path disposed in the first plate 14 and the second path disposed in the second plate 16B or 16C are connected to each other, a liquid may be injected in a direction of an arrow through one connection portion therebetween, and air may be discharged in a direction of an arrow through the opposite connection portion therebetween.

Referring to FIGS. 6 to 9, the directions in which the liquid and the air layers flow in and out may vary depending on the shapes and the locations of the first path disposed in the first plate 14 and the second path disposed in the second plate 16B or 16C.

Hereinafter, an embodiment of a method of forming the first path disposed in the first plate 14 will be described. The method described below with reference to FIGS. 10 and 11 is just one example for explaining the embodiment, and may be modified depending on the embodiment. Specifically, as described above with reference to FIGS. 8 and 9, in the case in which the first path disposed in the first plate 14 is located on the upper surface of the first plate 14, rather than on the inclined surface, it may be possible to dispose the first path so as to avoid the electrode or the insulation layer. However, as described above with reference to FIGS. 6 and 7, in the case in which the first path disposed in the first plate 14 is located on the inclined surface, the shape of the electrode or the insulation layer may be changed.

FIG. 10 illustrates a seventh example of the liquid lens.

As shown in the drawing, the insulation layer 72A may be disposed on the inclined surface 56 of the first plate up to a position below the first path 64B or 64C.

Referring to the cross-sectional view, the first electrode 76 is disposed on the third plate 12 below the first plate 14 and extends to a region on the inclined surface, and the insulation layer 72A is disposed on the first electrode. Here, the first electrode 76 and the insulation layer 72A may extend up to a position below the region in which the first path 64B or 64C is disposed.

FIG. 11 illustrates an eighth example of the liquid lens.

As shown in the drawing, the first path 64B or 64C extends to the inclined surface 56 of the first plate so as to penetrate the insulation layer 72B.

Referring to the cross-sectional view, the first electrode 76 is disposed on the third plate 12 below the first plate 14 and extends to the upper surface of the first plate via the inclined surface, and the insulation layer 72A is disposed on the first electrode. The first path 64B or 64C may penetrate the first electrode 76 or the insulation layer 72A.

Depending on the embodiment, the first electrode 76 may not be formed over the entire inclined surface 56, but may be formed in a predetermined pattern. In this case, the first path 64B or 64C may be disposed in an empty space formed in the pattern without penetrating the first electrode 76.

The above-described liquid lens may be included in a camera module. The camera module may include a lens assembly including a liquid lens mounted in a housing and at least one solid lens that may be disposed on the front surface or the rear surface of the liquid lens, an image sensor converting an optical signal transmitted through the lens assembly into an electrical signal, and a control circuit supplying a driving voltage to the liquid lens.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including the camera module including the above-described liquid lens may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

The invention claimed is:

1. A liquid lens, comprising:
   a first plate comprising a cavity formed therein to accommodate a conductive liquid and a non-conductive liquid therein;
   a first electrode disposed on the first plate;
   a second electrode disposed under the first plate;
   a second plate disposed on the first electrode; and
   a third plate disposed under the second electrode,
   wherein at least one of the first plate or the second plate comprises a structure formed therein to allow at least one of the conductive liquid or the non-conductive liquid to initially flow therethrough in one direction from an exterior of the liquid lens towards the cavity while the second plate is disposed on the first electrode, and the first electrode is not exposed by corner portions of the second plate.

2. The liquid lens according to claim 1, wherein the first electrode comprises at least one electrode sector, and the second electrode comprises two or more electrode sectors.

3. The liquid lens according to claim 1, further comprising an insulation layer disposed on the second electrode.

4. The liquid lens according to claim 1, wherein the structure is formed in a shape of a pipe or a hole having a circular or polygonal planar structure.

5. The liquid lens according to claim 3, wherein the structure comprises:
a first structure included in the first plate; and
a second structure included in the second plate, and
wherein the first structure and the second structure are connected to each other under predetermined conditions.

6. A camera module, comprising:
a liquid lens according to claim 1;
an image sensor converting a light transmitted through the liquid lens into an electrical signal; and
a control circuit generating or transmitting an electrical signal or a driving voltage transmitted through the first electrode and the second electrode included in the liquid lens to control an interface between the conductive liquid and the non-conductive liquid.

7. A liquid lens, comprising:
a first plate including a cavity formed therein to accommodate a conductive liquid and a non-conductive liquid therein;
a first electrode disposed on the first plate;
a second electrode disposed under the first plate;
a second plate disposed on the first electrode; and
a third plate disposed under the second electrode,
wherein a first groove and a second groove are formed in any one of an upper surface or a lower surface of the first plate so as to be connected to the cavity,
wherein the second plate or the third plate, which faces the first groove and the second groove, includes a first hole and a second hole formed therein so as to penetrate the upper surface and the lower surface thereof,
wherein, as the location of the plate facing the first groove and the second groove is adjusted or parallel movement or axial movement, a portion of the first groove is disposed so as to overlap a portion of the first hole in an optical-axis direction, and
wherein a portion of the second groove is disposed so as to overlap a portion of the second hole in the optical-axis direction.

8. The liquid lens according to claim 7, wherein the second electrode includes a plurality of electrode sectors, which are sequentially disposed in the clockwise direction about the optical axis.

9. A liquid lens, comprising:
a first plate including a cavity formed therein to accommodate a conductive liquid and a non-conductive liquid therein;
a first electrode disposed on the first plate;
a second electrode disposed under the first plate;
an upper plate disposed on the first electrode; and
a lower plate disposed under the second electrode,
wherein the cavity formed in the first plate comprises:
a first cavity formed in a circular shape; and
a second cavity extending from the first cavity and including a first groove and a second groove formed in the first plate,
wherein one of the upper plate and the lower plate, which faces the second cavity, includes a first hole or a slit, and a second hole formed therein,
wherein, as a location of the plate facing the second cavity with respect to the first plate is adjusted or parallel movement or axial movement, a portion of the first groove is disposed so as to overlap a portion of the first hole in an optical-axis direction, and
wherein a portion of the second groove is disposed so as to overlap a portion of the second hole in the optical-axis direction.

10. An optical apparatus, comprising:
a housing;
a display unit mounted in the housing and configured to output an image; and
a camera module mounted in the housing and obtaining an image,
wherein the camera module comprises:
an image sensor converting a light transmitted through a liquid lens into an electrical signal; and
a control circuit generating or transmitting an electrical signal or a driving voltage transmitted through a first electrode and a second electrode included in the liquid lens to control an interface between a conductive liquid and a non-conductive liquid,
wherein the liquid lens comprises:
a first plate comprising a cavity formed therein to accommodate the conductive liquid and the non-conductive liquid therein;
the first electrode disposed on the first plate;
the second electrode disposed under the first plate;
a second plate disposed on the first electrode; and
a third plate disposed under the second electrode,
wherein at least one of the first plate or the second plate comprises a structure formed therein to allow at least one of the conductive liquid or the non-conductive liquid to initially flow therethrough in one direction from an exterior of the liquid lens towards the cavity while the second plate is disposed on the first electrode, and the first electrode is not exposed by corner portions of the second plate.

11. A liquid lens, comprising:
a first plate comprising a cavity formed therein to accommodate a conductive liquid and a non-conductive liquid therein;
a first electrode disposed on the first plate;
a second electrode disposed under the first plate;
a second plate disposed on the first electrode; and
a third plate disposed under the second electrode,
wherein at least one of the first plate or the second plate comprises a structure formed therein to allow at least one of the conductive liquid or the non-conductive liquid to flow therethrough, the structure including:
a first structure included in the first plate; and
a second structure included in the second plate, and
wherein the first structure and the second structure are connected to each other under predetermined conditions.

12. The liquid lens according to claim 11, wherein the first structure and the second structure are connected to or separated from each other through rotation of the second plate to a predetermined angle on the first plate.

13. The liquid lens according to claim 12, wherein the predetermined angle is at least one of 45 degrees or 90 degrees.

14. The liquid lens according to claim 11, wherein the first structure and the second structure are connected to or separated from each other through movement of the second plate in a predetermined direction on the first plate.

15. The liquid lens according to claim 14, wherein the predetermined direction is one of an up-down direction or a left-right direction, and a moving distance is greater than a cross-sectional length of the first structure and less than half a value obtained by subtracting a diameter of a larger open region of the first plate from a size of the liquid lens, or less than a value obtained by subtracting the diameter of the larger open region from a diameter of an inner region of the second plate.

16. The liquid lens according to claim 11, wherein the second electrode extends from a region below the first plate to a height below the first structure, and
wherein an insulation layer disposed on the second electrode extends to a height below the first structure.

17. The liquid lens according to claim 11, wherein the first structure penetrates the second electrode and an insulation layer disposed on the second electrode.

18. The liquid lens according to claim 11, wherein the first structure is disposed in a predetermined pattern of the second electrode, and penetrates an insulation layer disposed on the second electrode.

19. The liquid lens according to claim 11, wherein the second structure comprises at least one structure of:
a path formed to be straight so as to allow at least one of the conductive liquid or the non-conductive liquid to pass therethrough in a direction from above to below or in a direction reverse thereto; or
a path including at least one bent portion so as to allow at least one of the conductive liquid or the non-conductive liquid to pass therethrough in a direction from side to below or in a direction reverse thereto.

20. The liquid lens according to claim 11, wherein the first structure comprises at least one structure of:
a path including at least one bent portion so as to allow at least one of the conductive liquid or the non-conductive liquid to pass therethrough in a direction from above to side or in a direction reverse thereto; or
a path including at least two bent portions so as to allow at least one of the conductive liquid or the non-conductive liquid to pass therethrough in a direction from above to side and thereafter from side to above or in a direction reverse thereto.

21. The liquid lens according to claim 11, wherein the second structure included in the second plate is spaced apart from a central region, through which an optical signal passes, by a predetermined distance.

* * * * *